(12) United States Patent
Holland et al.

(10) Patent No.: US 11,314,847 B2
(45) Date of Patent: Apr. 26, 2022

(54) METHOD FOR ELECTRONICALLY DOCUMENTING LICENSE INFORMATION

(71) Applicant: PROSTEP AG, Darmstadt (DE)

(72) Inventors: Martin Holland, Hannover (DE); Nobert Lotter, Rimbach (DE)

(73) Assignee: PROSTEP AG, Darmstadt (DE)

( * ) Notice: Subject to any disclaimer, the term of this patent is extended or adjusted under 35 U.S.C. 154(b) by 545 days.

(21) Appl. No.: 16/338,464

(22) PCT Filed: Oct. 4, 2017

(86) PCT No.: PCT/EP2017/075135
§ 371 (c)(1),
(2) Date: Aug. 12, 2019

(87) PCT Pub. No.: WO2018/065441
PCT Pub. Date: Apr. 12, 2018

(65) Prior Publication Data
US 2019/0384892 A1  Dec. 19, 2019

(30) Foreign Application Priority Data
Oct. 4, 2016  (DE) ..................... 10 2016 118 724.0

(51) Int. Cl.
*G06F 21/10*  (2013.01)
*G06F 16/23*  (2019.01)
*G06F 21/60*  (2013.01)

(52) U.S. Cl.
CPC ........ *G06F 21/105* (2013.01); *G06F 16/2365* (2019.01); *G06F 16/2379* (2019.01); *G06F 21/602* (2013.01); *G06F 2221/0759* (2013.01)

(58) Field of Classification Search
CPC ............... G06F 21/105; G06F 16/2365; G06F 16/2379; G06F 21/602; G06F 2221/0759
See application file for complete search history.

(56) References Cited

U.S. PATENT DOCUMENTS

| 6,389,402 B1 | 5/2002 | Ginter et al. |
| 2006/0021063 A1 | 1/2006 | Hori |

(Continued)

FOREIGN PATENT DOCUMENTS

EP  1923814 A2  5/2008

OTHER PUBLICATIONS

Melanie Swan. 2015. Blockchain: Blueprint for a New Economy (1st. ed.). 149 Pages.*

*Primary Examiner* — Matthew T Henning
(74) *Attorney, Agent, or Firm* — Smartpat PLC

(57) ABSTRACT

In a method for electronically documenting license information via the granting of a license and the use of said license in a network of several electronic data processing devices, the license information is added with a new transaction block to a decentralized transaction database and is managed using blockchain technology. When a license is granted to a licensee, a licensor generates new license information with a licensing input, the licensing input contains at least one license identification, and before, during or after use of the license granted by the licensor the licensee generates new license information with a license use input, and the license use input contains at least the license identification of the licensing input and a use identification. The licensing input can contain a license key encrypted with a public key of the licensee, with which the licensor and the licensee can generate and decrypt encrypted information.

19 Claims, 15 Drawing Sheets

(56) References Cited

U.S. PATENT DOCUMENTS

| | | |
|---|---|---|
| 2009/0210724 A1 | 8/2009 | Hori |
| 2011/0197078 A1 | 8/2011 | Hug |
| 2015/0278820 A1 | 10/2015 | Meadows |
| 2016/0275461 A1 | 9/2016 | Sprague et al. |
| 2017/0116693 A1* | 4/2017 | Rae ..................... H04L 9/3236 |
| 2017/0331896 A1* | 11/2017 | Holloway ................ H04L 9/12 |

* cited by examiner

FIG 4
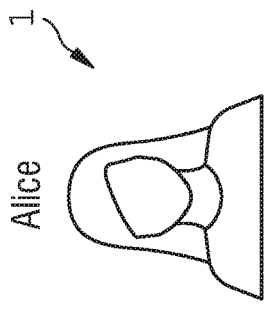
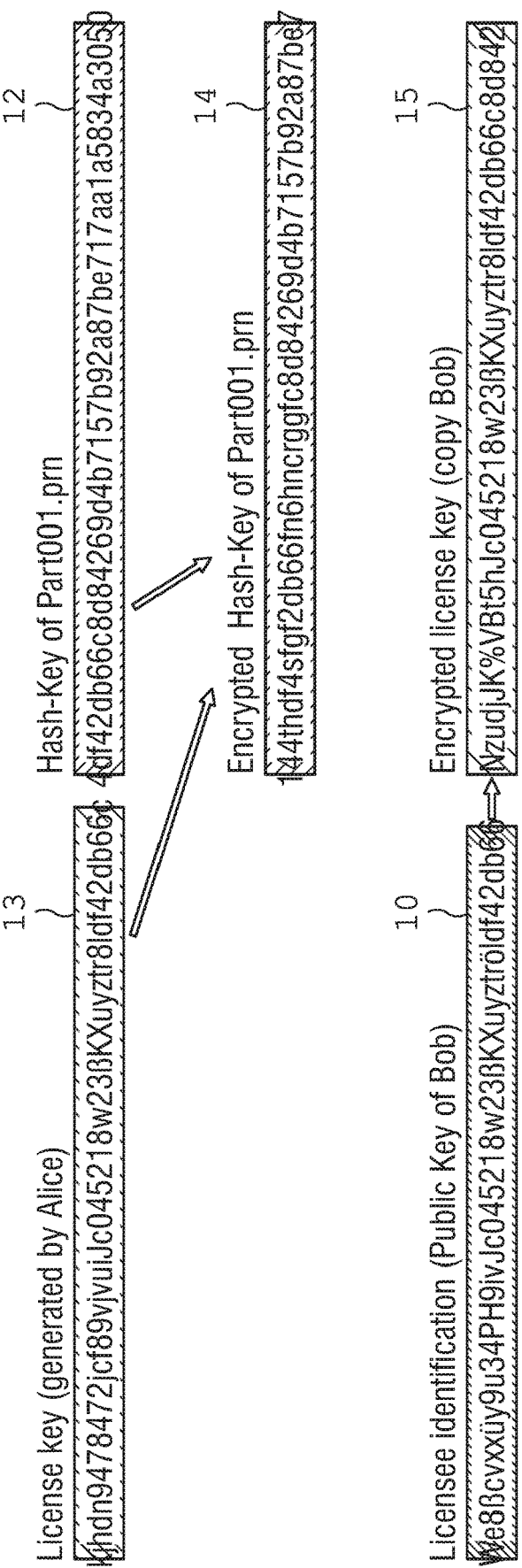

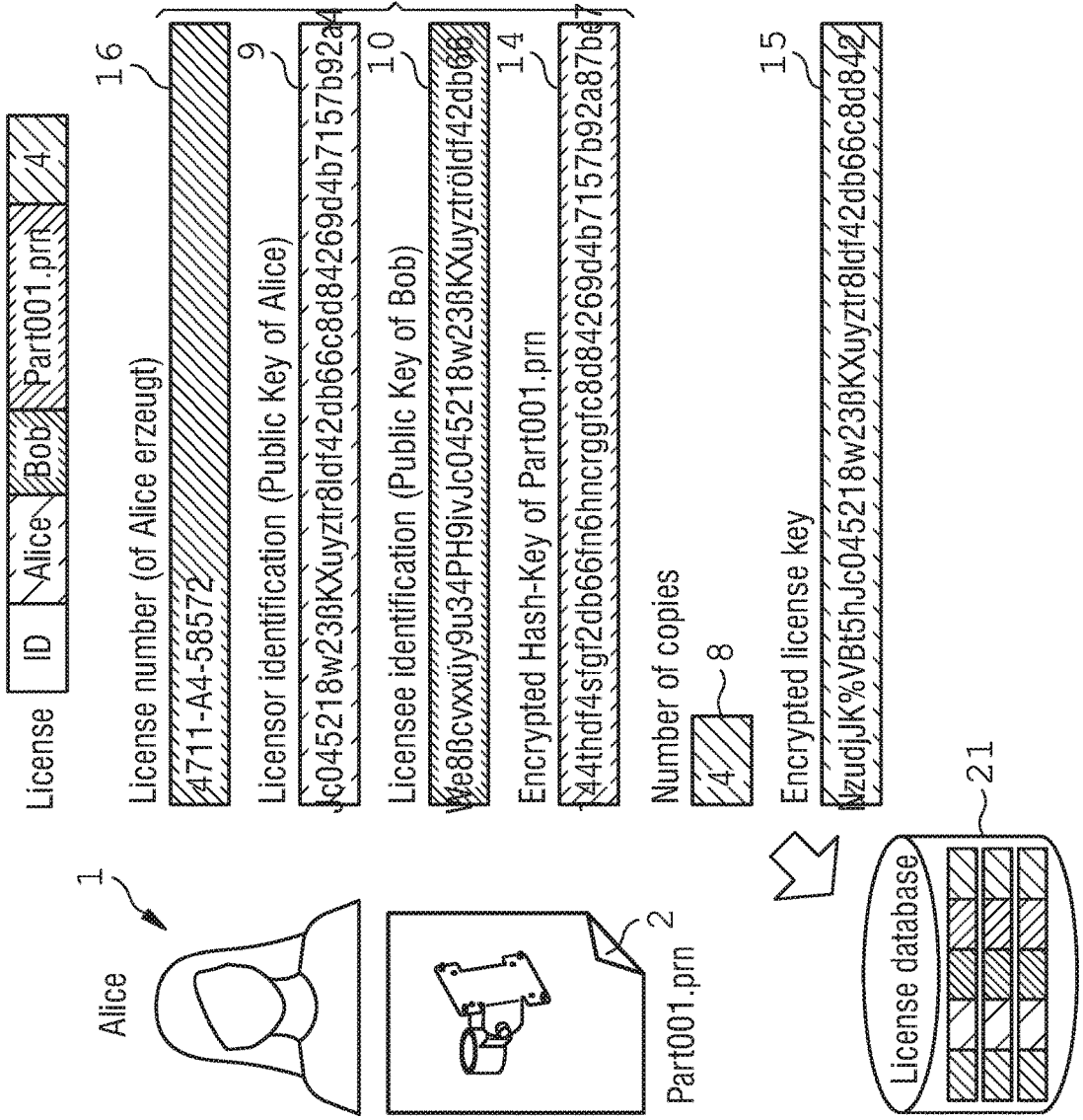

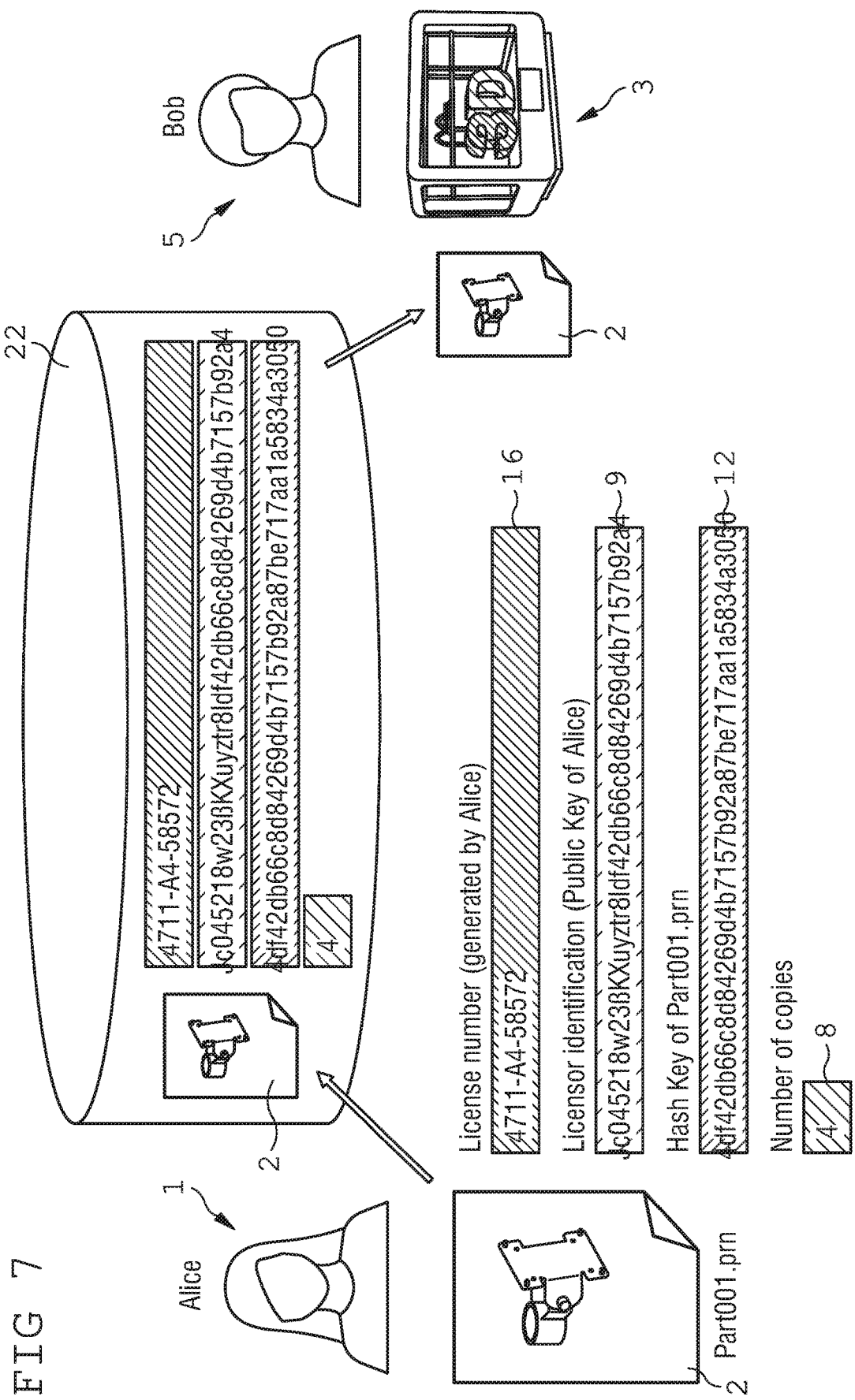

| FIG 8A | FIG 8B |

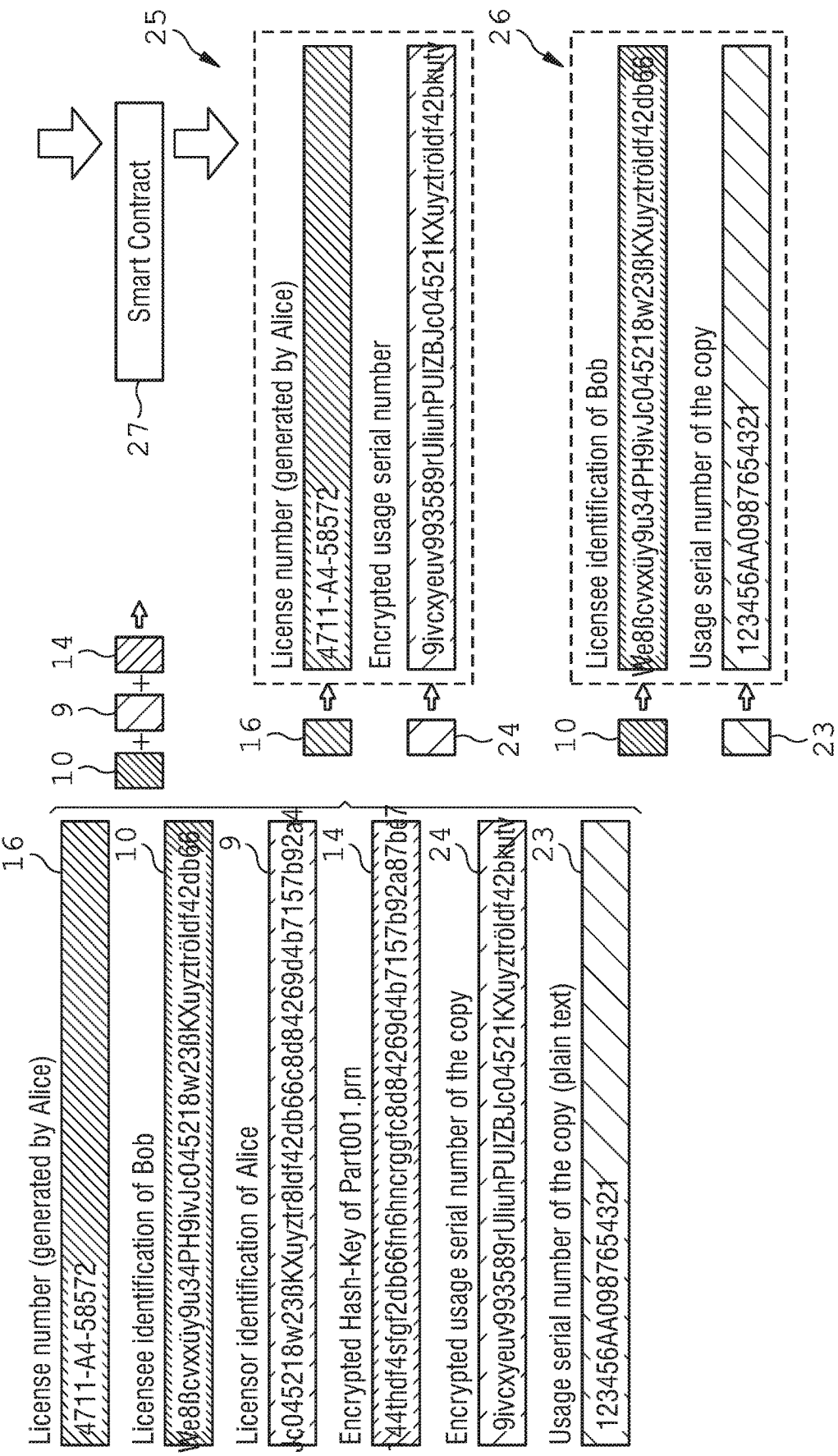

FIG 12

Publicly visible data of the involved parties

Licensee identification of Bob (known)
We8ßcvxxüy9u34PH9ivJc045218w23ßKXuyztröldf42d... — 10

Licensor identification of Alice (known)
Jc045218w23ßKXuyztr8ldf42db66c8d84269d4b7157b92a4 — 9

Hash-Key of Part001.prn (calculatable)
4df42db66c8d84269d4b7157b92a87be717aa1a5834a3050 — 12

Usage serial number of the product (known)
123456AA0987654321 — 23

Blockchain entries

6 ↘

| Licensing entry (3D print license) | |
|---|---|
| License number | 4711-A4-58572 — 16 |
| License identification | pvinoiM3498vmv945dmc8u39s98vp8w349fa98938uz58... — 7 |
| Number | 4 — 8 |
| Encrypted license key | NzudjJK%VBt5hJc045218w23ßKXuyztr8ldf42db66c8d84... — 15 |

25 ↘

| First licensing entry | |
|---|---|
| License number | 4711-A4-58572 — 16 |
| Encrypted usage serial number | 9ivcxyeuv993589rUliuhPUlZBJc04521KXuyztröldf42bkut... — 24 |

26 ↘

| Second licensing entry | |
|---|---|
| Licensee identification of Bob | We8ßcvxxüy9u34PH9ivJc045218w23ßKXuyztröldf42d... — 10 |
| Usage serial number (plain text) | 123456AA0987654321 — 23 |

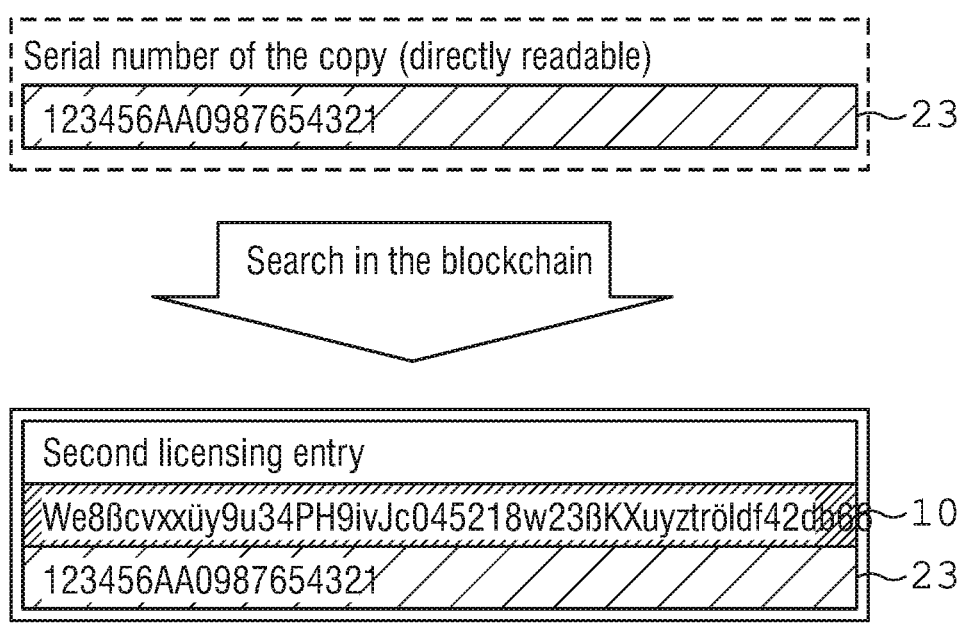

METHOD FOR ELECTRONICALLY DOCUMENTING LICENSE INFORMATION

TECHNICAL FIELD

The disclosure relates to a method for the electronic documentation of license information items about a granting of a license and about the utilization of this license in a network of a plurality of electronic data processing devices that are connectable to one another in a data-transferring manner.

BACKGROUND

The granting of a license is agreed upon between a licensor and a licensee. This agreement is usually documented both by the licensor and by the licensee and possibly documented or stored in a database in an electronic data processing device managed by the licensor or by the licensee. If necessary, the licensor and the licensee can refer to their respective own documentation for the agreement regarding the granted license. If the licensor or the licensee wishes to access the documentation of the respective other party for any other reason, security and confidentiality issues must be considered when accessing the documentation.

Managing electronic documentation of license information items routinely requires that these license information items are managed by a trusted entity. Usually, the licensor manages the license information items relevant to him about the granting of a license, while the licensee manages the information items relevant to him about the utilization of this license. After expiration of an agreed period, the licensee must normally provide the licensor with license information items about the already effected utilization of the license. These information items will be are archived independently by both the licensee and the licensor in order to be able to revert to them when needed. An independent verification of the respective license information items is in many cases neither provided nor practicable.

Typically, an agreement to grant a license will require that the licensee documents his utilization of the license and periodically notifies and documents the licensor to the extent to which the license has been utilized. The extent of the utilization of the license is in many cases also the basis for determining the license fees. The licensor must therefore either trust the documentation provided by the licensee or initiate a verification of this documentation.

In order to minimize the administrative burden of such a license agreement as much as possible, periods of one quarter or one calendar year are often agreed upon, within which the licensee gathers the information items on the usage of the license in order to make it available to the licensor after expiry of the given period of time. A timely and, for example, up-to-the-minute information item of the licensor on the use of the license he had granted up to that time is scarcely possible and, in any case, associated with a high and often disproportionately great administrative burden for both the licensee and the licensor. These information items must also be exchanged as confidentially as possible between the licensee and the licensor so that third parties do not receive any confidential information items not intended for the public about the extent of the licensing, the parties involved in the licensing and about the license already used.

For a customer who wants to acquire or acquires a product in accordance with the license, it is scarcely sensible or verifiable on a regular basis whether the related product was manufactured within the scope of a valid utilization of the license. In order to be able to verify the legality of the concerned product, the customer must either contact the licensee or the licensor and trust the license information items provided to him upon request. However, such verification on whether a product has been lawfully produced by a valid utilization of a license requires that the customer knows the licensor or the licensee, and that the licensor or the licensee provides the license information items required to verify the product. The administrative burden involved in verifying the legality of individual products is enormously great, so that routine verification of individual products is hard to perform.

SUMMARY

It is therefore considered to be an object of the present invention to provide a method for the electronic documentation of license information items in a network of a plurality of electronic data processing devices that are connectable to one another in a data-transferring manner, so that the management of the license information items can be performed as reliably and easily as possible. Furthermore, a verification of whether a license was legally utilized, both for the licensor and for a third party, shall be possible and can be performed reliably with the least possible effort.

This object is achieved by a method, wherein the license information items are managed in a decentralized transaction database using a blockchain technology, wherein the transaction database contains a chain of transaction blocks, and wherein new license information items can be added to the transaction database in new transaction blocks by a block generation method, wherein in the block generation method, first, an output block information item generated using information items about a previous transaction block of the transaction database and an integrity criterion for adding the new transaction block into the transaction database are obtained from the network, wherein subsequently a new transaction block is generated, which meets the integrity criterion and which contains at least the output block information items, the new license information item and an integrity information item, and wherein the new transaction block is finally added to the transaction database, wherein upon granting a license, a licensor generates a new license information item with a licensing entry, which licensing entry is added to the transaction database in a new transaction block using the block generation method, wherein the licensing entry includes at least one license identification, and wherein before, during, or after use of the license of the licensor, the licensee generates a new license information item with a license usage entry, which is added to the transaction database in a new transaction block using the block generation method, wherein the license usage entry contains at least the license identification of the licensing entry and a usage identification.

Using the method, the license information items of the licensor and the licensee can be stored in a decentralized transaction database, which does not need to be set up and managed centrally by the licensor or the licensee, but rather is managed with blockchain technology known from the prior art. The decentralized transaction database is available to each party or to each data processing device, which fulfills the requirements for participation and use of the transaction database. The licensor and the licensee do not have to trust each other or grant access rights to their own database in order to be able to store valid license information items in the transaction database. Nevertheless, using the method, all relevant aspects of the security and the confidentiality of the license information items stored in the decentralized transaction database can be taken into account and implemented in a simple manner.

In the case of the known blockchain technologies, the specification of the integrity criterion regularly specifies a task, the solution of which is associated with effort. This concept, also known as "proof of work", is intended to ensure that new transaction blocks can not be generated as easily and as quickly as desired and be added to the transaction database. For example, a threshold value for a permissible hash value of a new transaction block can be specified as an integrity criterion, in which transaction block one or more transactions or information items to be stored and a freely selectable integrity information item are combined. The integrity information item must be selected by elaborate trials so that, for example, the resulting hash value for the new transaction block lies below the predetermined threshold and thus meets the integrity criterion. A manipulation of older transaction blocks would then require that for all subsequent transaction blocks, the integrity information item must be redetermined and the integrity criterion fulfilled again, since in each successive transaction block, an output block information item dependent on the previous transaction block is included, which would also change when the previous transaction block is manipulated.

Since the license information items, when using the block generation method, can only be added to the transaction database when a transaction block containing the license information items meets a specifiable integrity criterion and the integrity criterion can be specified such that a subsequent manipulation and modification of license information items in the transaction database can be virtually ruled out, the license information items stored in the transaction database are very trustworthy without the licensor or the licensee having to observe and adhere to excessive security precautions for adding the license information items to the transaction database. In addition, access to the transaction database need not be restricted or completely denied to third parties in order to be able to exclude unwanted later changes to the license information items.

Various implementations of a blockchain technology are known in practice which allow any party of a network to add new transaction blocks to the transaction database, provided that the respective participants fulfill the requirements for participation in the transaction database. These requirements relate in many cases only to an electronic data processing device set up in a suitable manner, with which a usually standardized access to the transaction database can be performed, and a registration as a participant with access authorization for the transaction database. It is in principle possible that the block generation method, with which a new license information item is added to the transaction database into a new transaction block, is performed neither by the licensor nor by the licensee, but rather by an independent participant having access options to the transaction database.

In many cases, several different information items are first gathered and combined into an information block from which the new transaction block is generated. It is not necessary, and often impractical, for a license information item to be added to the transaction database to generate its own new transaction block. Rather, it is common and expedient that the license information item to be added is transmitted to many participants of the transaction database and, using the methods known from blockchain technology, one of the participants generates the new transaction block and adds it to the transaction database. In many blockchain technologies, the license information item to be added is usually communicated to all participants who are involved in generating new transaction blocks and adding them to the transaction database. Other participants who merely want to record information items or transactions in the transaction database or want to extract information items from the transaction database, but do not participate in the generation of new transaction blocks, do not need the license information items to be added and therefore are not provided with license information items that were not yet recorded in the transaction database. The block generation method, and thus the addition of the license information item to the transaction database, does not have to be performed by the licensor or by the licensee himself. There can also be a plurality of license information items being entered in the same new transaction block and added to the transaction database at the same time.

According to one embodiment, it is provided that the licensing entry and the license usage entry contain different types of information and therefore also have data formats that differ from one another. In this case, the number of data items and the respective length or number of bits of a single data entry can differ from one another. Both the licensor and the licensee are familiar with the relevant data formats and can extract the relevant license information items and usage identifications from the relevant transaction block. It is also possible that the licensing entry and the license usage entry in the respective transaction blocks can be identified by a separate transaction identification and distinguished from one another.

Since the decentralized transaction database can be viewed via any electronic data processing device equipped in a suitable manner, it is fundamentally possible for third parties to determine and retrieve license information items in the transaction database, with which information items it is possible to verify a product manufactured using a license. The freely available license information items can be viewed by any third party even without precise knowledge of the licensor or the licensee and also without detailed knowledge of the underlying license agreement. For this reason, it is expedient that the licensor and the licensee store unencrypted information about the license agreement that is to be viewed by third parties, while the information items that the licensor and the licensee wish to keep confidential should be suitably encrypted. In asymmetric encryption procedures, the licensor and the licensee are each assigned a freely available public key and a private key available only to the user concerned. The licensor and the licensee can each encrypt certain information items for the other with their public key, so that the encrypted information items can only be decrypted with the associated private key.

The licensing entry contains a license key encrypted with a public key of the licensee so that the licensor and the licensee can generate and decrypt encrypted information items using the license key. The license key is intended to be used in a symmetric encryption procedure in which information items encrypted with the license key can only be decrypted again with the same license key. By recording the license key encrypted using an asymmetric encryption procedure in the licensing entry, the licensor can provide the license key generated by him to the licensee so that both information items encrypted with that license key can be exchanged confidentially in the decentralized transaction database. While third parties can view the license information item from the transaction database, however, they do not decrypt and use the information items encrypted therein using the license key available only to the licensor and licensee.

Separate communication between the licensor and the licensee, which would need to be kept confidential and secured by separate means, is not required. If the licensor and the licensee so desire, after the license key has been exchanged, confidential information can be exchanged in connection with the licensing and, in particular, individual usage information items of the licensee, which is confidential and intended only for the licensor, are encrypted and exchanged with the license key. The information items encrypted with the license key can then be exchanged without separate security measures and, for example, also be added in new transaction blocks to the decentralized transaction database.

According to a particularly advantageous embodiment, it is provided that the usage information items are encrypted with the license key in the license usage entry generated by the licensee. As a result, only the licensor and the licensee can decrypt and evaluate the related usage information items.

According to an advantageous embodiment of the method, it is provided that the licensing entry contains a file information item representing a usage data file. For example, the usage data file can contain information items or instructions needed by the licensee to manufacture a product in accordance with the license or provide a service in accordance with the license when the license is utilized. For example, instructions can be stored in the usage data file with which a 3D printer can manufacture a product in accordance with the license. The usage data file can also contain CAD information items or CAM information items that can be supplied by the licensee to an automated production system to be able to manufacture a product in accordance with the license.

For example, the file information can be a hash value determined from the usage data file that uniquely identifies the related usage data file. The file information item can be encrypted with the license key. In this way, a third party who can access the usage data file and can also calculate a hash value for the usage data file can be prevented from comparing this hash value with license information items from the transaction database and compiling information items about a license agreement that may exist for this usage data file. Since the file information item is encrypted with the license key known only to the licensor and the licensee, only the licensor and the licensee can generate license information items using the encrypted file information item or identify it in the transaction database.

The usage data file can, for example, also be a digitally stored account or digital audiovisual data transmitted to a publisher who is to produce and issue the related work, or to be made available to a user in the context of a user license. It is also conceivable that the usage data file can contain medical or otherwise confidential information items, the access and use of which is specified and controlled by a license agreement or license-like agreement.

According to one embodiment, it is provided that the licensing entry contains a licensor identification and a licensee identification. Both the licensor and the licensee can identify the licensing entry, regardless of the license identification, and use the license information items contained therein about the licensor identification and licensee identification. If the licensor identification and the licensee identification are stored unencrypted in the licensing entry, third parties having access to the transaction database can also be aware of the licensor and the licensee and of the existence of a licensing agreement between that licensor and that licensee. It can be expedient that the licensor identification and the licensee identification are stored encrypted in the licensing entry using the license key or using another algorithm so that only the licensor and the licensee are aware of the respective identification. Since the licensor identification and the licensee identification could also be used to create further transaction blocks in the transaction database, an encrypted storage of the licensor identification and the licensee identification prevents an unauthorized misuse of these information items to generate further license information items in the decentralized transaction database.

In order to avoid use of the license by unauthorized persons who are not the licensee, it is advantageously provided that only the licensee identified by the licensee identification obtains the authorization to generate a permissible license usage entry. This can be ensured, for example, by virtue of the fact that the license identification has components or is at least partially composed of information items which are known only to the licensor and the licensee. For example, the licensor could provide the licensee with an encrypted information item that is included as part of the license identification or that is required to generate the license identification. The encrypted information item could be, for example, the encrypted license key, wherein the licensor encrypts the license key generated by the licensee for a symmetric encryption procedure using the public key of the licensee and sends it to the licensee. It is also conceivable that another information item necessary for the license identification and specified by the licensor is encrypted with a public key of the licensee identified by the licensee identification, so that only the authorized licensee, who is also in possession of the private key associated with this public key, for decrypting the related information, in order to be able to subsequently generate a permissible license usage entry.

If necessary, an examination procedure can then be used to automatically verify whether, for a new license usage entry, the information item specified by the licensor and suitably encrypted was used or should be used to generate the license usage entry. Only in this case, upon successful confirmation that the related information item is present when the license usage entry is generated, is the license usage entry actually generated, otherwise, a corresponding attempt is declined or rejected. It is also possible to perform a verification of the authorization of the licensee in other ways, for example, by a separate verification procedure, in which the licensor is involved and must confirm the authorization of the licensee.

With regard to the lowest possible administrative effort and for the fastest possible and automated implementation of the method, it is optionally provided that the authorization of the licensee to generate a permissible license usage entry is automatically verified during the generation of a new transaction block and the generation is refused when no authorization can be proven during a verification of the licensee identification. An automated verification is possible in the context of blockchain technology, for example, with "smart contracts". Smart contracts are computer program modules which run automatically when a new transaction block is generated, thereby performing various verifications on both the contents of a new transaction block and the users participating therein. The smart contracts can also be used to automatically generate, from the specified information items that are handed over to the corresponding computer modules, a licensing entry or license usage entry and to add it to the transaction database with a transaction block.

In order to generate a unique license identification with little effort, which can be used for all license information items for a particular license agreement and at the same time, as far as possible, excludes confusion with license information items for another license agreement, it is provided that the license identification is a hash value calculated using a hash algorithm which was determined on the basis of at least the licensor identification, the licensee identification and the encrypted file information. In addition to the licensor identification and licensee identification identifying the parties to the license agreement, the encrypted file information item can be used to identify the license agreement underlying the usage data file and to generate a unique license identification. Since the file information item expediently enters into the license identification in encrypted form and encryption of the file information item of the license key is required, which is known only to the licensor and the licensee, third parties can not draw conclusions about the file information item and thus about a usage data file, the subject the license agreement via the license information.

A previously described automated verification of the authorization of a licensee could, for example, lie with automatically verifying whether the license key can be generated on the basis of the licensor identification and the licensee identification and using the hash key of the file information item.

To simplify the management of the license information items, it is provided that the licensing entry contains a usage restriction information item. In addition, it is provided that the license usage entry contains a license usage information item. In particular, in a license agreement with which the licensor licenses to his licensee the production or use of a predetermined number of products or a quantitative specification for the use of his license is provided, this information item can be communicated to the licensee as a quantity by the usage restriction information item and stored in the transaction database at the same time. In the same way, it can be provided that each license usage entry generated by the licensee and entered into the transaction database contains a license usage information item so that the licensor is informed about the utilization already made of his license and about the remaining and not yet utilized use of the license.

For example, the license usage information item can include the information items about the extent to which the licensee has used the license since his last license usage entry entered in the transaction database. If the licensee generates a license usage entry for each individual use of the license, the license usage information item can also be represented by a "1" or consecutive counter that captures each license usage entry of the licensee in the transaction database. It is also conceivable that the licensee summarizes a number of products manufactured in accordance with the license in the meantime in a license usage entry and stores a license usage information item corresponding to this number. By verifying all license usage entries stored in the transaction database up to this point in time, the licensor and the licensee can determine at any time to what extent the license has already been used and to what extent further use of the license is possible or agreed upon.

It is also conceivable that the license usage information item is determined as a difference between the usage restriction information item minus all license usages already used up to that point in time and is entered by the licensee in his license usage entry. In this way, the information item can be taken from the respective current license usage entry without any further reference to past license usage entries, to the extent the agreed license can still utilized by the licensee. Since the usage restriction information item is known, it can also be determined, on the basis of the remaining usage, to what extent the license has already been utilized.

The usage restriction information item of the licensor can also include a period of time or a duration of time. The licensee can use the usage data file within the time period specified by the usage restriction information items, and thereby either perform a maximum number of accesses or access thereto as often as desired. Outside of or after the expiration of the licensed duration of use, access to the usage data file can be blocked, thereby precluding unauthorized use of the usage data file. With such usage restriction information items, for example, digital rights management can be performed for text, music or audiovisual works distributed in digital form.

According to a particularly advantageous configuration, it is provided that the license usage information item in the license usage entry contains a unique usage serial number. This usage serial number is generated by the licensee and can be used to mark a product in accordance with the license or a service provided in accordance with the license by the licensee or as evidence for use of the usage data file in accordance with the license. Thus, the usage serial number of the licensee can either be used unencrypted or encrypted as an identification or document and attached, for example, to a product manufactured by the licensee utilizing the license. This usage serial number is communicated to the licensor by recording the usage serial number in the license usage entry of the licensee. Both the licensee and the licensor can then verify each product, using a usage serial number on the basis of the usage serial numbers stored in the license usage entries already entered in the transaction database, on whether it is a valid usage serial number and legally granted by the licensee.

If the usage serial number is stored unencrypted by the licensee in a license usage entry that is transferred to the decentralized transaction database, each third party can also determine the assigned license usage entry on the basis of the usage serial number displayed on the product and at least determine that a valid license usage entry has been generated for that usage serial number. This verification of a product provided with a usage serial number can be performed by the third party solely through a verification of the decentralized transaction database without the third party having to know the licensee or the licensor and without the third party knowing more details about the underlying license agreement. In this way, for the benefit of all concerned, with little effort, a verification can be enabled for individual products which are provided with a usage serial number.

The usage serial number can be represented by any data information item. For example, one-dimensional or two-dimensional barcodes or alphanumeric character strings can also be used as the usage serial number. The usage serial number can be represented and used as a unique identifier in any form of presentation. It clearly means in this context that no two permissible usage serial numbers may match, so that a unique assignment of the usage serial number to an identifiable use is possible.

In order to prevent unauthorized manipulation or copying of a usage serial number legitimately granted by the licensee which would enable a third party to mark an unlawfully manufactured product, for example, with a copy of a usage serial number, it is expediently provided that the licensee makes such manipulation and a corresponding misuse of the usage serial number assigned by him and used for the identification of his product more difficult by suitable measures. Many suitable measures are known from practice, with which an unauthorized copy of the usage serial number can be made difficult for third parties.

It is also possible for the usage serial number to be encrypted with the license key. In this way, even if all license information items in the transaction database are verified, third parties can not assign the usage serial number granted by the licensee to the license granted by the licensor.

On the one hand, to allow a protected and encrypted information exchange between the licensee and the licensor in the transaction database, and on the other hand, to allow third parties to verify the legitimacy of a product or license use of a usage serial number, the disclosure provides that the licensee, for each license usage entry containing license usage information items encrypted with the license key, additionally adds a further license information item to the transaction database, wherein the further license information items include a license serial number entry containing at least the licensee identification and the unencrypted unique usage serial number. Any third party can then identify the license serial number entry in the transaction database on the basis of the unencrypted usage serial number and thus obtain information that the usage serial number belongs to a valid license usage entry generated by the licensee whose licensee identification is also disclosed. Via the licensee identification, the third party can identify the licensee and, if necessary, ask for additional information items on the product identified with the usage serial number.

In this way, not only the granting and usage of a license is documented in the transaction database, but also a proof of legality is generated and provided for a product identified with the usage serial number. Third parties can convince themselves, on the basis of the usage serial number contained in the transaction block, that the related product has been manufactured by the licensee as part of a lawful use of a license agreement. Such a verification of the usage serial number can be made by anyone via an optionally automatable query to the transaction database, and thereby the legality of the product identified with the usage serial number is verified without direct contact with the licensor or the licensee being necessary. It is therefore scarcely possible for unauthorized third parties to provide counterfeit products with a false usage serial number and to successfully commercialize them, since counterfeit products with a false usage serial number can easily be identified by a failed verification of the transaction database.

It is a significant advantage of the method that, when using a suitable encryption of each information item considered confidential, for example, the licensing and in particular the extent of licensing and authorized licensee or at least the use of which has already been made known only to the licensor and the licensee, and despite logging in transaction blocks in the transaction database, third parties can not interpret these encrypted information items. For the benefit of third parties, the usage serial number displayed on a product can be stored in plain text in a corresponding license information item in the transaction database, allowing an easy verification of a legitimately manufactured product and the identification of unauthorized counterfeiting for each party.

According to a particularly advantageous embodiment, it is provided that each new transaction block containing a licensing entry or a license usage entry is added to the transaction database with the aid of a software module executed on a data processing system, wherein the software module automatically verifies whether the licensing entry is initiated by the licensor or the license usage entry by the licensee, and whether the license usage entry relates to a previous licensing entry. Such software modules, with the help of which, before adding a transaction block into the transaction data, the validity of the information items gathered in the transaction block can be verified on the basis of predetermined validity criteria, are known from practice for various implementations of blockchain technology. Suitable software modules can include an appropriate implementation of validation rules, also referred to as "smart contracts". With the help of these software modules, the required validation rules can be processed and verified in an automated manner so that an unauthorized manipulation with the addition of new license information items to the decentralized transaction database can be made difficult or largely eliminated without increasing effort on the part of the licensor or licensee. The software modules can also verify further validation rules for new licensor entries or license usage entries in order to make more difficult the unauthorized generation of license information items in the transaction database as a function of a desired manipulation security.

Various implementations of blockchain technologies for managing decentralized transaction databases are known in practice, which at least partially also include implementations of suitable software modules or "smart contract" solutions. It is possible to make use of already existing blockchain technologies in performing the method for the electronic documentation of license information items. In many cases, only a small adaptation of the known blockchain technologies and implementations to the needs of the parties to a license agreement and to the license information items to be stored in the decentralized transaction database is required. It is also possible to provide suitable interfaces for third parties with which, for example, on the basis of a predetermined usage serial number, verifications of the legality of the correspondingly identified products can be performed or additional information items on a license agreement and the parties involved can be provided to which the usage serial number is assigned. Since the time-consuming and labor-intensive method steps and in particular the block generation method can be largely automated, neither the licensor nor the licensee incurs an excessive amount of effort for the administration and use of the license information. In addition, the use of a decentralized transaction database, which can be managed with the blockchain technologies that are already proven in practice, can dispense with the separate provision of licensing information items by the licensor or the licensee and a separate effort for the protection sought in many cases against unauthorized access or manipulation of these license information items by the licensor or the licensee.

Such software modules can be used advantageously for performing the method. In doing so, information items available to only the licensor or the licensee can be verified in automated method steps on whether the licensing entry originates from the licensor and a license usage entry from the licensee before the relevant licensing entry or license usage entry is added to a new transaction block and thus also to the transaction database. A manipulation of the license information items by third parties is made considerably more difficult without the participants having to expend more effort or separate security measures.

The disclosure also relates to a method for the automated release of a usage data file for use in a data processing device of a utilization device connectable to the network, wherein a release authorization for an authorization request is derived from an electronic documentation of license information items. It is provided that the electronic documentation of license information items is managed with the above-described method for the electronic documentation of license information items about a granting of a license and about a utilization of this license in a network of a plurality of electronic data processing devices connectable to one another in a data-transferring manner, wherein the license information items include at least one licensing entry, wherein those license information items are determined in a permission query step in the transaction database and read out as authorization information items associated with the data information item of the usage data file to be released, or contain a license identification previously stored in the data processing device of the utilization device, and wherein in a subsequent authorization verification step on the basis of the authorization information items, an authorization release is determined by verifying whether the authorization request relates to a use of the usage data file which is not excluded by the usage restriction information item or has already been performed and exhausted on the basis of the license usage information item, and the usage data file for use with the utilization device is released, if the authorization release is determined.

A device serving as a utilization device in the context of the disclosure can be an automated production system such as a 3D printer, with which a predetermined number of products are to be manufactured on the basis of information items from a usage data file to be released. The utilization device can also be a device for reproducing image and/or sound information items of the usage data file in order to reproduce, for example, rights of use of video data, music data or text data acquired by a user within the scope of a licensed use. The utilization device can be used as a component of a digital rights management, with which digital data, in which a licensee has acquired rights of use, can be reproduced within the scope and extent of the rights of use acquired by him and can be utilized. The utilization device can be designed in many ways and can be provided for many different purposes of use. The utilization device need only have a suitably set-up data processing device that is connectable to a network in order to retrieve and process information items from the transaction database.

In order to determine whether a usage of a usage data file desired by the user is covered by the license agreement and is thus authorized, the utilization device can automatically access the transaction database and determine in a permission request step those license information items relevant to the verification of the authorization to use the usage data file. In this case, either all license information items relevant for this file information item can be determined and evaluated on the basis of the file information item associated with the usage data file in order to be able to calculate the extent of the usage licensed by the licensor and the extent of the use already made by the licensee. The license information items relevant to that end can also be determined on the basis of a license identification previously stored in the utilization device. In this case, the license identification can be entered directly by a user or, however, determined on the basis of the information items necessary for determining the license identification, such as on the basis of at least the licensor identification, the licensee identification and the encrypted file information item, if these information items are stored by a user or automated in the utilization device.

In the subsequent authorization verification step, the authorization release can then be determined, and it is determined whether the user and the licensee are entitled to the usage of the usage data file desired by him. If the usage restriction information item includes a predetermined number of licensed uses and a previous usage of the usage data file has already taken place and is stored in the transaction database, the authorization can be verified by determining the total license usage taken place and comparing it with the maximum license usage specified by the licensor, which is represented by the licensing number. If, in the case of a previous license usage, a license usage information item representing the remaining license usage is already stored in the transaction database, this information item is sufficient to be able to verify and assess the authorization for the desired use of the usage data file. If the usage restriction information items include a duration of time or a period of time, it can be verified whether the authorization request concerns usage of the usage data file in the licensed time period and the usage data file is released in response to the authorization request immediately or at a predetermined usage time.

The usage data file is only released for use with the utilization device if an authorization is required for the desired use. Both in the systems for digital rights management known from practice and in production systems such as 3D printers, which can produce a product on the basis of the instructions stored in the usage data file, appropriate measures should be taken to ensure that an unauthorized use of the usage data file can be made as difficult as possible or possibly completely prevented. Using the method for the automated release of the usage data file, the effort for verifying the authorization to use the usage data file can be considerably reduced and the release procedure can be automated. The automation that is possible not only speeds up the authorization verification and release of the usage data file and simplifies it for all participants, but also significantly limits the possibilities of misuse or unauthorized use of the usage data file. Using a utilization device set up and operated according to the disclosure, it can be ensured in favor of the licensor and the licensee that only the products agreed upon in accordance with the license can be produced with the production system. Any further use and unintended use of the usage data file can be ruled out by appropriate measures taken of the utilization device. For example, the utilization device can be set up and operated in such a way that the utilization data file is first transmitted to the production system immediately after a successful examination of the usage authorization immediately before a production process and stored and used there in a volatile memory only for the duration of the production process in order to be automatically deleted again after the production process ends.

When the usage data file is used to manufacture a product using a production system, the utilization device can optionally automatically generate a new license information item and a license usage entry before, during, or after use of the license of the licensor, which is added to the transaction database in a new transaction block with the block generation method, wherein the license usage entry contains at least the license identification of the licensing entry and a usage identification. The licensee only has to store the information items required for the automated creation of a new license usage entry in the production system, which in turn must be able to access the transaction database via a data network. During production, for example, the production system can then generate a license usage entry during and after each individual production operation and add it to the transaction database without the licensee having to actively intervene or act. The license usage entry generated by the production system can represent any variation of the previously described options for a license usage entry.

If the usage data file is used to manufacture a product using a production system, a unique usage serial number can be generated before or during manufacture of the product, the product can be identified with the usage serial number, and a license usage entry and additionally a further license information item can also be added to the transaction database, wherein the further license information item contains a license serial number entry and the unencrypted unique usage serial number. The production system can be suitably set up and provided with the necessary information items by the licensee such that the above-described method steps can be run in an automated manner during the manufacture of a product.

Hereinafter, some exemplary embodiments of the inventive concept are explained in more detail, which are shown by way of example in the drawing.

BRIEF DESCRIPTION OF THE DRAWINGS

FIG. 4 is a schematic representation of individual information items generated by the licensor for the licensing entry.

FIG. 7 is a schematic representation of how the licensor and the licensee can exchange a usage data file with the information items contained in the licensing entry, which usage data file is required for the utilization of the licenses granted by the licensor.

FIG. 11 is a schematic representation of a license usage entry and of a further license information item that can be generated by the licensee and stored as electronic documentation in the transaction database.

FIG. 12 is a schematic representation of the publicly visible information items and of a licensing entry, of a license usage entry and of a further a further license information item that can be generated by the licensor and licensee and stored as electronic documentation in the transaction database.

FIG. 13 is a schematic representation of an examination process in which a third party can determine, starting from a license serial number reproduced on a product by a verification of the decentralized transaction database, whether or that, for this license serial number, a license information item is stored in the transaction database.

DETAILED DESCRIPTION

Figure 1:
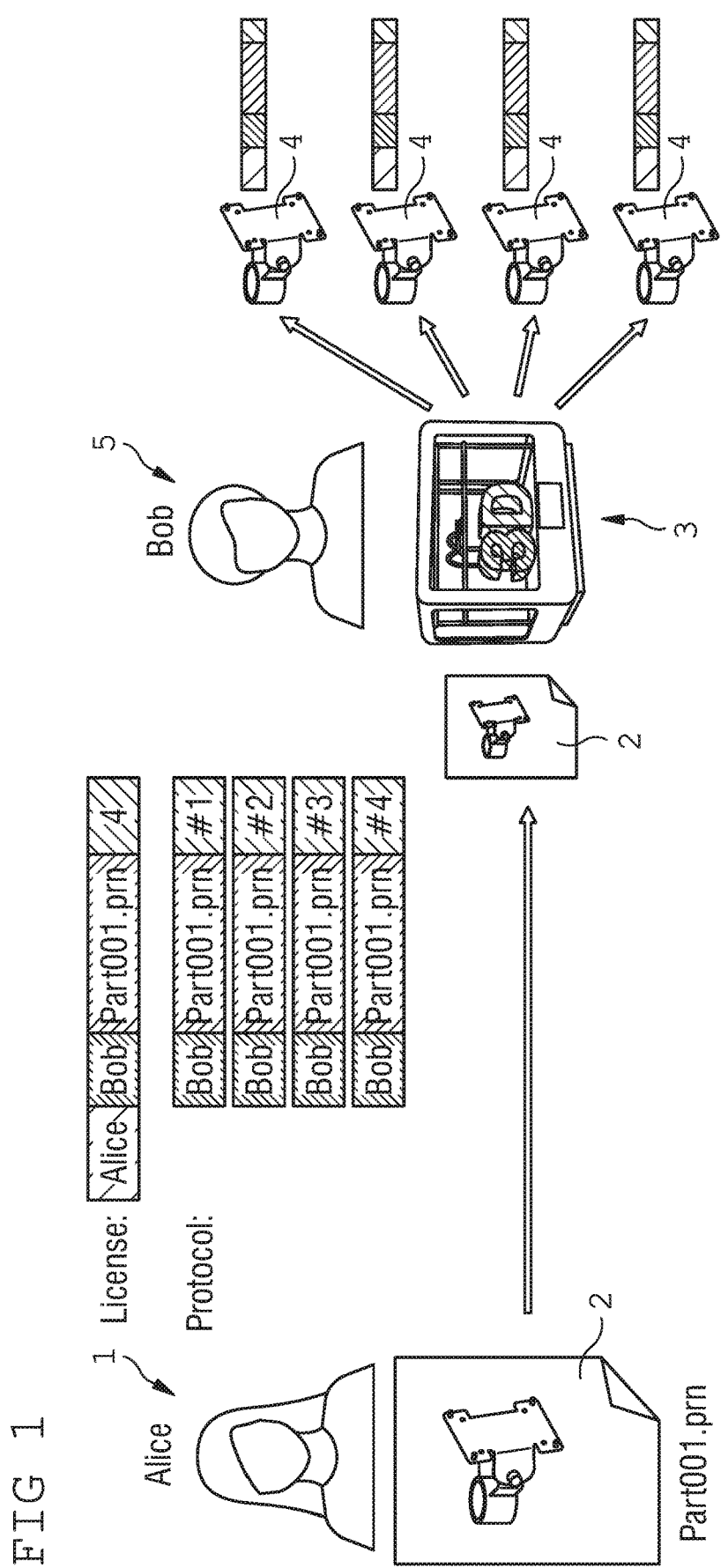
FIG. 1 is a schematic representation of an initial situation of a licensing agreement between a licensor and a licensee, wherein the license granted by the licensor includes the manufacture of four product units which are to be manufactured by the licensee in accordance with the specifications of the licensor.

In the starting situation illustrated by way of example in FIG. 1, the licensor 1, also referred to below as "Alice", is in possession of a usage data file 2 designated as "Part001.prn" which contains machine-readable information items with which several copies 4 of a product can be generated with the aid of a 3D printer 3. The licensee 5, referred to below as "Bob", is the owner of the 3D printer 3. The licensor 1 and the licensee 5 conclude a license agreement which is to enable the licensee 5 to manufacture four copies 4 of the product defined by the usage data file 2 using his 3D printer 3 using the usage data file 2. Both the granting of the license by the licensor 1 and the respective utilization of the license by the licensee 5 is to be electronically documented as license information items.

Figure 2:
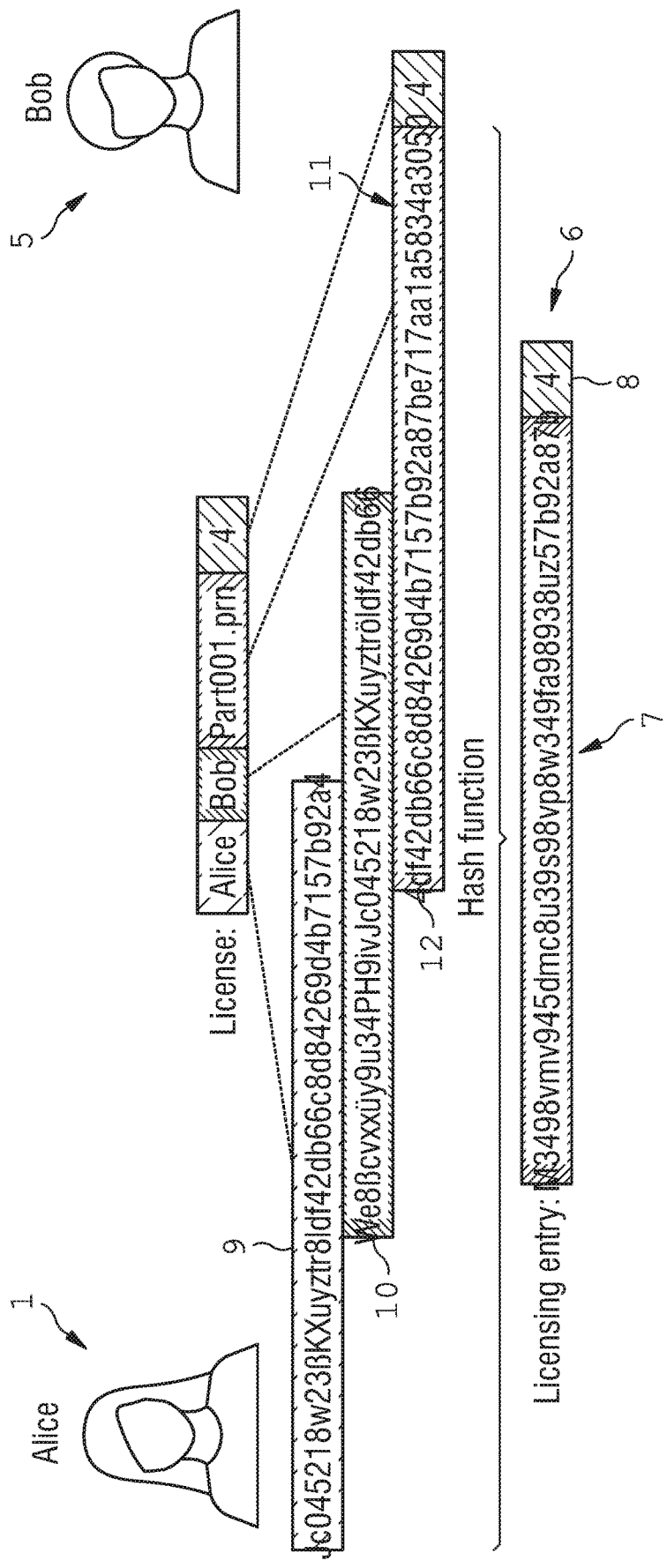
FIG. 2 is a schematic representation of a licensing entry generated by the licensor.

FIG. 2 schematically shows that a licensing entry 6 generated by the licensor 1 can be composed of a plurality of information items. The licensing entry 6 shown schematically in FIG. 2 has a license identification 7 and a usage restriction information item 8. The license identification 7 is composed of a licensor identification 9, a licensee identification 10 and a file information item 11. The file information item 11 is represented by a hash value 12 calculated using a hash algorithm, which is calculated using a suitable hash algorithm from the usage data file 2. The licensor identification 9 and the licensee identification 10 can each correspond to a public key of the licensor 1 or of the licensee 5, also referred to as a "public key". For the respective public key, the licensor 1 and the licensee 5 each have a private key, also referred to as a "personal key" or "private key". The public key and the private key can be used with an asymmetric encryption procedure.

The license identification 7, which the licensor 1 generates in the embodiment illustrated in FIG. 2, consists of a hash value which is calculated using a hash algorithm from the licensor identification 9, the licensee identification 10 and the hash value 12 of the file information item 11. The usage restriction information item 8 is unencrypted and readably recorded in the licensing entry 6 in plain text.

Figure 3:
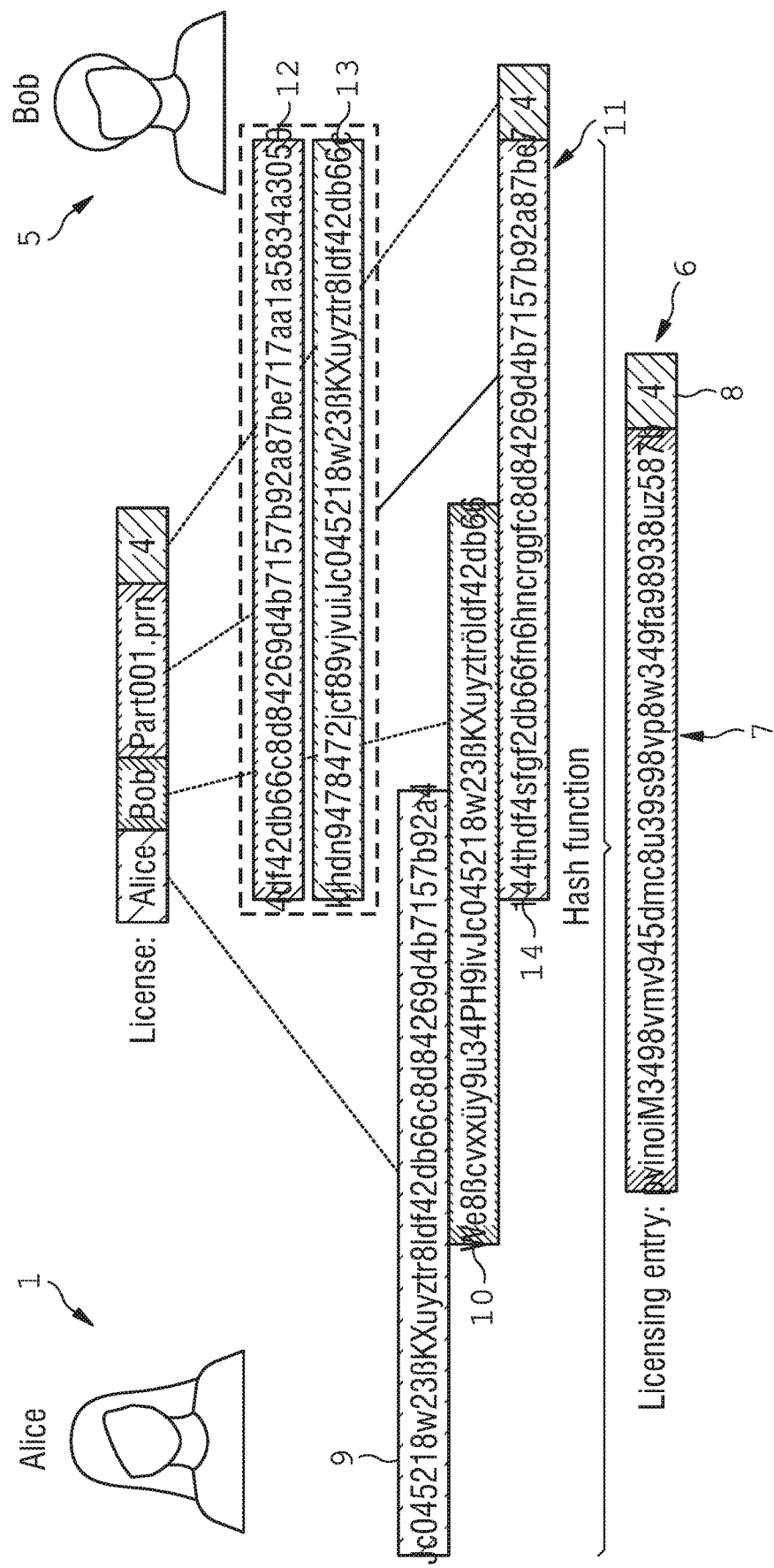
FIG. 3 is a schematic representation of a licensing entry generated differing from the licensor, in which the file information item was encrypted with a license key.

For reasons of security and in view of the fact that the licensor 1 and the licensee 5 may wish to treat information items about the concluded license agreement as confidential, it can be expedient for the file information item 11 to be additionally encrypted before the file information item 11 is recorded in the licensing entry 6. A corresponding embodiment is shown by way of example in FIG. 3. An encrypted file information item 11 can be generated by encrypting the hash value 12 of the usage data file 2 using a previously provided license key 13 and generating an encrypted hash value 14. The encrypted hash value 14 can be recorded as an encrypted file information item 11 in the license identification 7 and combined into a licensing entry 6 having changed content.

The license key 13 is provided for use with a symmetric encryption procedure and is specified by the licensor 1. FIG. 4 shows how the licensor 1 encrypts the hash value 12 from the usage data file 2 using the license key 13 and thereby generates the encrypted hash value 14. The license key 13 must be made available to the licensee 5 so that the licensee 5 can decrypt the encrypted hash value 14. For this purpose, the licensor 1 encrypts the license key 13 using the public key of the licensee 5, which in this embodiment corresponds to his licensee identification 10, and generates a license key 15 encrypted for the licensee 5, which is also identified in FIG. 4 as an "encrypted license key (Copy Bob)". The license key 15 encrypted for the licensee 5 must be made available to the licensee 5.

Figure 5:
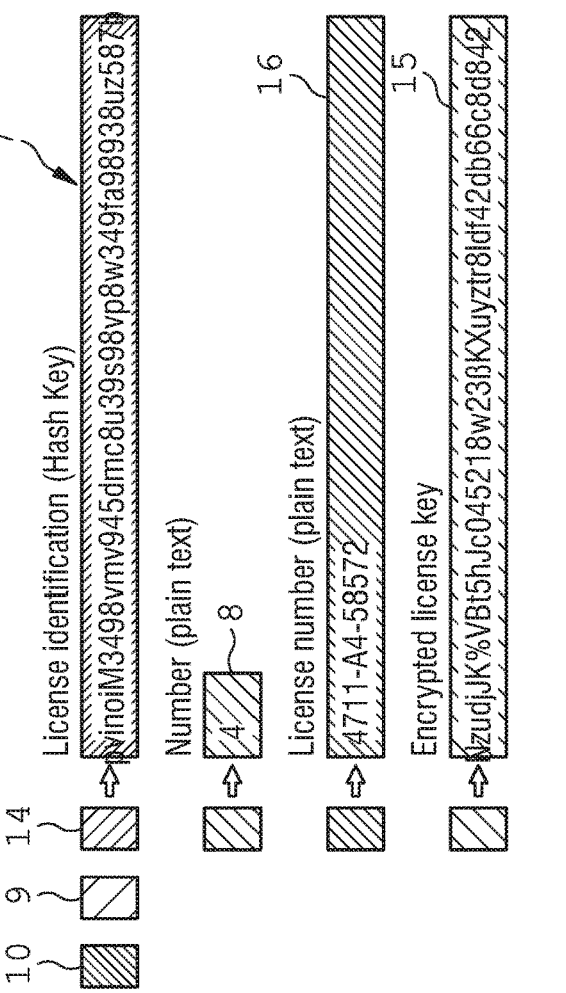
FIG. 5 is a schematic representation of how the individual information items can be transferred from the licensor into the licensing entry.

FIG. 5 schematically shows a licensing entry 6 provided with further information items. Licensor 1 generates, in addition to the information items already described, a license number 16, which is recorded unencrypted in licensing entry 6 and represents one of each recognizable reference to the underlying license agreement.

Figure 6B:
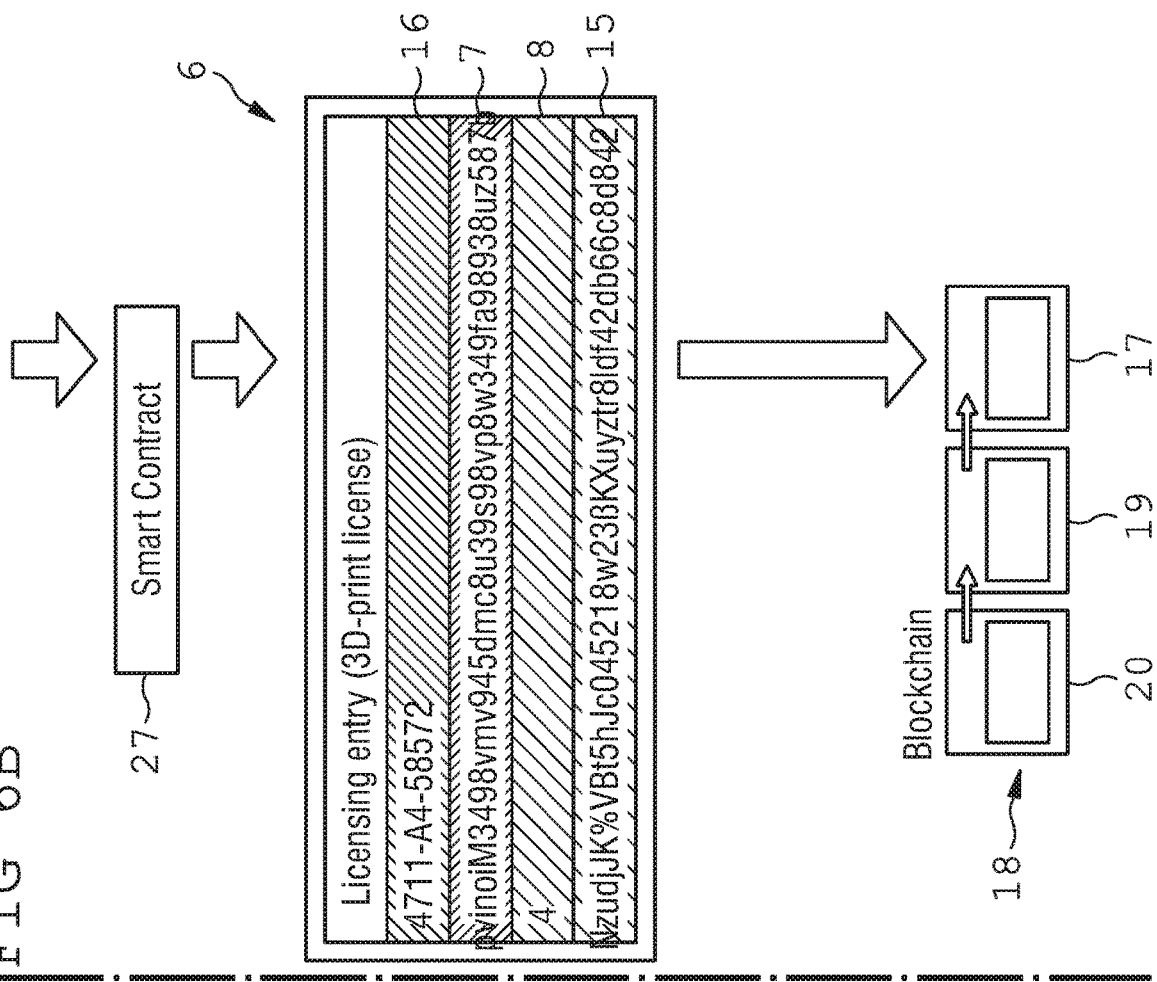
FIG. 6 is a schematic representation of a licensing entry generated by the licensor, which includes additional information items for the licensee, and its transfer into a new transaction block, which is added to a transaction database using a block generation method.

The licensing entry 6 is converted into a new transaction block 17 in a block generation method and added to a decentralized transaction database 18, also referred to as a "blockchain". In this case, the new transaction block 17 is linked to exactly one previous transaction block 19 of the transaction database 18, so that the transaction database 18 is formed by a chain of transaction blocks 17, 19, 20. In addition, the licensor 1 can also store and archive the license information items generated by him in an electronic database 21 managed by the licensor 1. These aspects of the method are shown schematically in FIG. 6. In this case, the information items required for the licensing entry 6 and further information items from the licensor 1 are transmitted to a software module 27 with which the validity of the licensing entry 6 and the authorization of the licensor 1 to add this licensing entry 6 to the transaction database 18 are verified automatically. Thus, it can be verified using the software module 27, whether the information items in the licensing entry 6 match with the licensor identification 9 and the licensor 1 initiates the licensing entry 6.

FIG. 7 schematically shows that no direct communication between the licensor 1 and the licensee 5 is required for the transmission of the usage data file 2, which in turn would involve a considerable effort with regard to the desired security and confidentiality. The usage data file 2 can be stored by the licensor 1 on an external storage device 22 managed or hosted by a third party. The storage device 22 can be designed and operated as a secure exchange platform. The licensee 5 only receives access to the usage data file 2 when he is properly identified and his authorization for retrieval of the usage data file 2 has been verified and confirmed. The licensee 5 can then use the usage data file 2 to manufacture the copies 4 of the licensed product in accordance with the license with the aid of his 3D printer 3.

Figures 8, 8A:
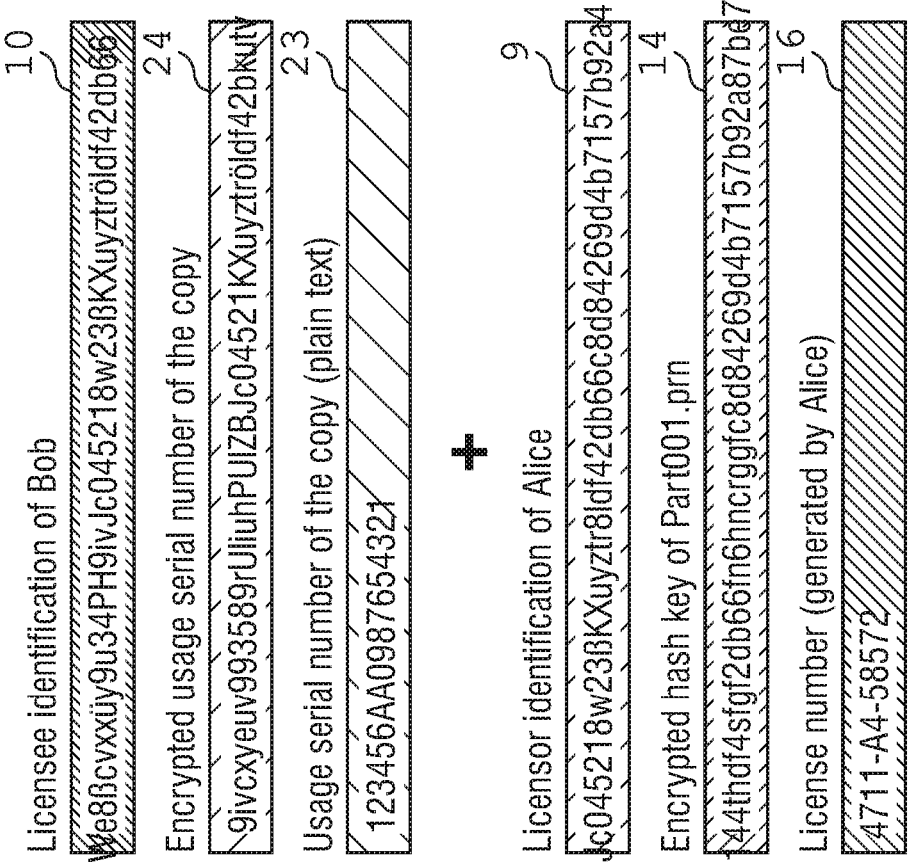
FIG. 8 is a schematic representation of how the licensee generates a license usage entry and a further license information item using the block generation method, and adds it to the decentralized transaction database.
Figure 8B:
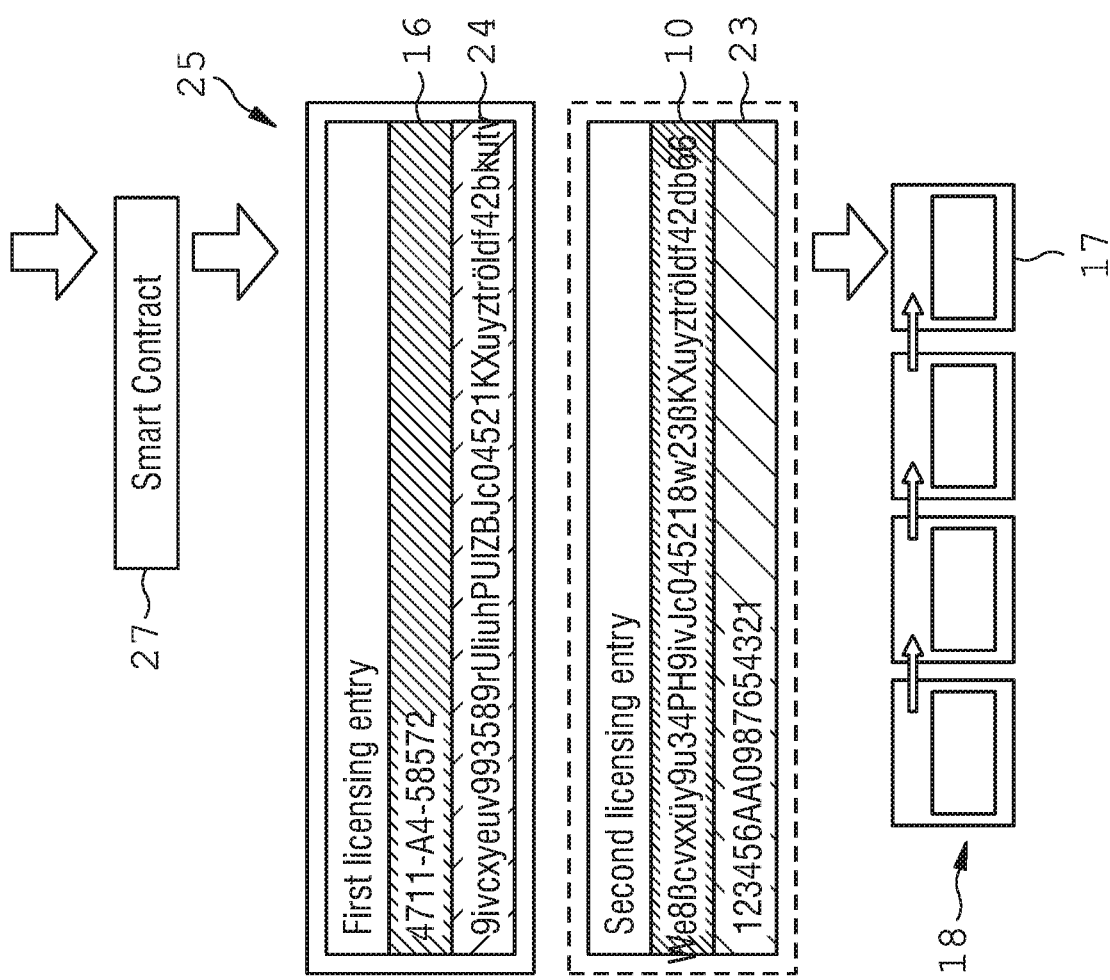

In this case, the licensee 5 generates a usage serial number 23 for each copy 4 of the product manufactured in accordance with the license and a usage serial number 24 encrypted using the license key 13. The licensee 5 then generates a first license usage entry 25 for the licensor 1 using the method and a second license usage entry 26 using a further license information item intended for third parties, as shown schematically in FIG. 8. The first license usage entry 25 contains the license number 16 generated by the licensor 1 and the encrypted usage serial number 24. Since the encrypted usage serial number 24 was encrypted using the license key 13 known only to the licensor 1 and the licensee 5, only the licensor 1 can determine the usage serial number 23 from the license usage entry 25 and assign it to the underlying license agreement via the license number.

The licensee 5 can also use the public key of the licensor 1 to encrypt the usage serial number 23.

The second license usage entry 26 contains the usage serial number 23 in plain text and the licensee identification 10. Third parties can identify the second license usage entry 26 in the transaction database 18 on the basis of the usage serial number 23 reproduced on the copy 4 of the product manufactured by the licensee 5 and thereby determine that a second license usage entry 26 is stored in the transaction database 18. In addition, third parties can record contact with the licensee 5 via the licensee identification 10 and obtain additional information items on the copy 4 of the product manufactured in accordance with the license.

The first license usage entry 25 and the second license usage entry 26 are also transmitted by the licensee 5 to the software module 27 together with further information items with which it is verified via validity verifications stored there on whether the license usage entries 25, 26 relate to a previous licensing entry 6 and whether the license usage entries 25, 26 are initiated by the licensee 5. In this case, the software module 27 can also verify, for example, whether the license identification 7 originally calculated by the licensor 1 can be calculated from the available information items and matches it. The license usage entries 25, 26 are only entered into the transaction database 18 when all validity verifications performed by the software module 27 were performed without error.

Figure 9:
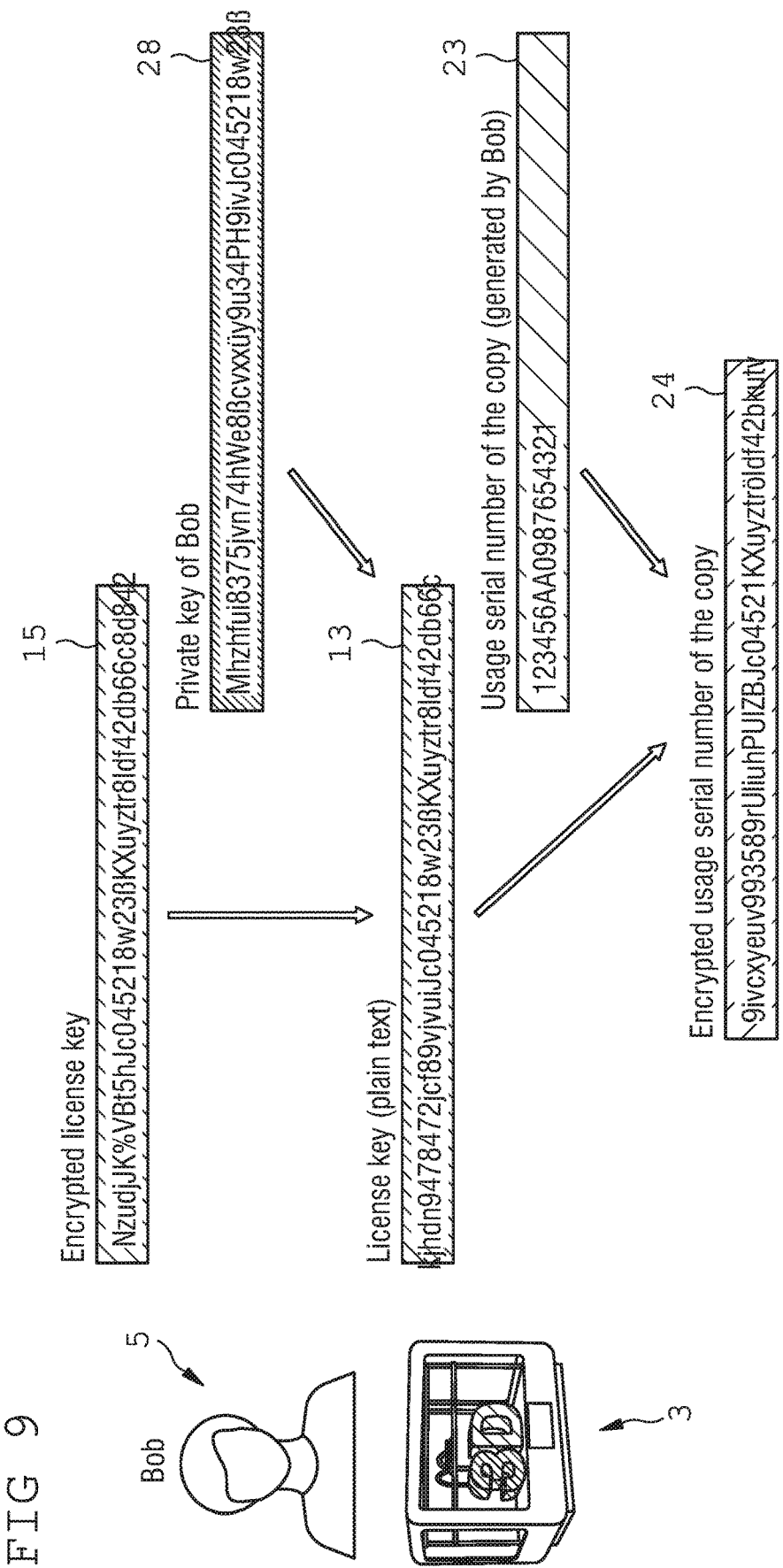
FIG. 9 is a schematic representation of how the licensee determines a first information item for the license usage entry generated by him.
Figure 10:
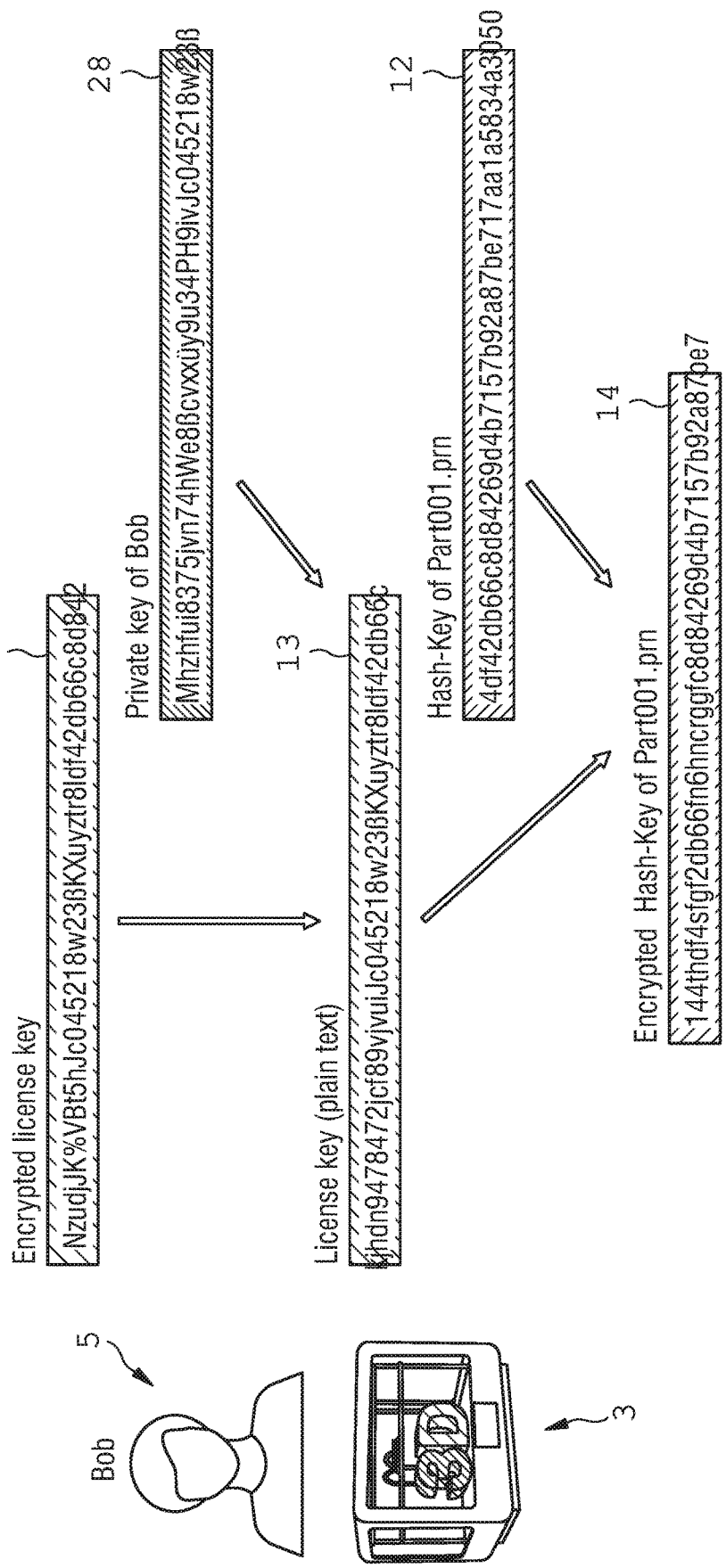
FIG. 10 is a schematic representation of how the licensee determines a second information item for the license usage entry generated by him.

FIGS. 9 and 10 show schematically how the licensee 5 can generate the encrypted usage serial number 24 and the encrypted hash value 14 of the usage data file 2 from the information items provided to him by the licensor 1 and from his private key 28 designated as "personal key of Bob" with the aid of the license key 13.

According to FIG. 11, the first license usage entry 25 generated by the licensee 5 contains as a license identification the license number 16 specified by the licensor 1 and the encrypted usage serial number 24, which were determined by the licensee 5 from the information items known to him. Only a single copy 4 is assigned to the first license usage entry 25, so that this corresponds to a license usage information item of "1" and the licensor 1 is informed that a copy 4 has been manufactured. Several copies 4 could also each be gathered in the first and second license usage entry 25, 26, in which case a corresponding license usage information item is assigned.

The licensor identification 9, the licensee identification 10 and the encrypted hash value 14 of the file information item 11 are each transmitted by the licensee 5 to the software module 27 and used to pass the validity verification performed automatically by the software module 27. The first license usage entry 25 of the licensee 5 includes the license number 16 as a license identification and the encrypted usage serial number 24, so that the licensor 1 can read the usage serial number 23 in plain text after a decryption performed by him using the license key 13. No third party can extract the usage serial number 23 in plain text from the first license usage entry 25, since the required license key 13 required for it is not known.

The second license usage entry 26 contains no license agreement and the licensor 1, but the licensee identification 10 and the usage serial number 23 in plain text. Each third-party having access to the transaction database 18 can identify the second license usage entry 26 on the basis of the usage serial number 23.

FIG. 12 schematically shows the publicly visible information items and the licensing entry 6 generated by the licensor 1 and the first license usage entry 25 generated by the licensee 5 and the second license usage entry 26.

FIG. 13 schematically shows only that any third party can procure information items on the basis of the usage serial number 23, which is reproduced, for example, on copy 4 manufactured by licensee 5 and it is thus identifiable to the third party that a license agreement for this copy 4 exists. For this purpose, the third party must review the entire transaction database 18 with the individual transaction blocks of the transaction database 18 and identify a second license usage entry 26 in which the usage serial number 23 is stored in plain text. When such a license usage entry 26 with the searched usage serial number 23 is present, proof is provided that the usage serial number 23 belongs to a legitimate license. The licensee identification 10 is also stored in this second license usage entry 26, so that the third party can contact the licensee 5 and retrieve further information items.

LIST OF REFERENCE CHARACTERS 1. licensor
2. usage data file
3. 3D printer
4. copy of a product
5. licensee
6. licensing entry
7. license identification
8. usage restriction information item
9. licensor identification
10. licensee identification
11. file information item
12. hash value of the usage data file
13. license key
14. encrypted hash value
15. encrypted license key
16. license number
17. new transaction block
18. transaction database
19. previous transaction block
20. old transaction block
21. database of the licensor
22. external storage device
23. usage serial number
24. encrypted usage serial number
25. first license usage entry
26. second license usage entry
27. software module
28. private key of the licensor

The invention claimed is:

1. A method for the electronic documentation of license information items about a granting of a license and a utilization of that license in a network of a plurality of electronic data processing devices that are connectable to one another in a data-transferring manner,
   wherein the license information items are managed in a decentralized transaction database (18) using blockchain technology,
   wherein the transaction database (18) contains a chain of transaction blocks (19, 20), and
   wherein new license information items are able to be added to the transaction database (18) in new transaction blocks (17) by a block generation method,
   wherein in the block generation method
      first, an output block information item generated with information items about a previous transaction block (19) of the transaction database (18) and an integrity criterion for the addition of the new transaction block (17) to the transaction database (18) is obtained from the network, wherein
      subsequently, a new transaction block (17) is generated, which meets the integrity criterion and which contains at least the output block information item, the new license information item and an integrity information item, and wherein
      finally, the new transaction block (17) is added to the transaction database (18),
   wherein a licensor (1), when granting a license to a licensee (5), generates a new license information item with a licensing entry (6), which is added to the transaction database (18) in a new transaction block (17) using the block generation method, wherein the licensing entry (6) contains at least one license identification (7), and
   wherein the licensee (5) generates a new license information item with a license usage entry (25) before, during or after use of the license of the licensor (1), which license usage entry is added to the transaction database (18) in a new transaction block (17) using the block generation method, wherein the license usage entry (25) contains at least the license identification (7) of the licensing entry (6) and a usage identification,
   wherein the license usage entry (25) contains a license usage information item, and
   wherein the license usage information item in the license usage entry (25) contains a unique usage serial number (23), and
   wherein the licensing entry (6) contains a license key (15) encrypted with a public key of the licensee (5), so that the licensor (1) and the licensee (5) can generate and decrypt encrypted information items using the license key (13), and
   wherein the license usage information item in the license usage entry (25) is encrypted using the license key (13).

2. The method according to claim 1, wherein the licensing entry (6) contains a usage restriction information item (8).

3. The method according to claim 1, wherein the usage serial number (23) is encrypted using the license key (13).

4. The method according to claim 1, wherein the licensee (5) additionally adds a further license information item (26) to the transaction database (18) for each license usage entry (25), wherein the further license information item (26) includes a license serial number entry which contains at least the licensee identification (10) and the unencrypted unique usage serial number (23).

5. The method according to claim 1,
   wherein each new transaction block (17) containing a licensing entry (6) or a license usage entry (25) is added to the transaction database (18) with the aid of a software module running on a data processing system,
   wherein the software module automatically verifies whether the licensing entry (6) is initiated by the licensor (1) or the license usage entry (25) by the licensee (5), and whether the license usage entry (25) relates to a previous licensing entry (6).

6. The method according to claim 1,
   wherein the license authorizes the licensee to manufacture a product or provide a service, and
   wherein the unique usage serial number (23) is used to mark the product or the service.

7. A method for the electronic documentation of license information items about a granting of a license and a utilization of that license in a network of a plurality of electronic data processing devices that are connectable to one another in a data-transferring manner, wherein the license information items are managed in a decentralized transaction database (18) using blockchain technology, wherein the transaction database (18) contains a chain of transaction blocks (19, 20), and wherein new license information items are able to be added to the transaction database (18) in new transaction blocks (17) by a block generation method, wherein in the block generation method first, an output block information item generated with information items about a previous transaction block (19) of the transaction database (18) and an integrity criterion for the addition of the new transaction block (17) to the transaction database (18) is obtained from the network, wherein subsequently, a new transaction block (17) is generated, which meets the integrity criterion and which contains at least the output block information item, the new license information item and an integrity information item, and wherein finally, the new transaction block (17) is added to the transaction database (18), wherein a licensor (1), when granting a license to a licensee (5), generates a new license information item with a licensing entry (6), which is added to the transaction database (18) in a new transaction block (17) using the block generation method, wherein the licensing entry (6) contains at least one license identification (7), and wherein the licensee (5) generates a new license information item with a license usage entry (25) before, during or after use of the license of the licensor (1), which license usage entry is added to the transaction database (18) in a new transaction block (17) using the block generation method, wherein the license usage entry (25) contains at least the license identification (7) of the licensing entry (6) and a usage identification, wherein the license usage entry (25) contains a license usage information item, and wherein the license usage information item in the license usage entry (25) contains a unique usage serial number (23), and wherein the license authorizes the licensee to manufacture a product, and wherein the unique usage serial number (23) is used to mark the product with a barcode or alphanumeric character string.

8. The method according to claim 7, wherein the licensing entry (6) has a data format other than the license usage entry (25).

9. The method according to claim 7, wherein the licensing entry (6) contains a license key (15) encrypted with a public key of the licensee (5), so that the licensor (1) and the licensee (5) can generate and decrypt encrypted information items using the license key (13).

10. The method according to claim 9, wherein the license usage information item in the license usage entry (25) is encrypted using the license key (13).

11. The method according to claim 9, wherein the licensing entry (6) contains a file information item (11) representing a usage data file (2).

12. The method according to claim 11, wherein the file information item (11) is encrypted using the license key (13).

13. The method according to claim 11, wherein the licensing entry (6) contains a licensor identification (9) and a licensee identification (10).

14. The method according to claim 13, wherein only the licensee (5) identified by the licensee identification (10) receives an authorization to generate a permissible license usage entry (25).

15. The method according to claim 14, wherein the authorization of the licensee (5) to generate a permissible license usage entry (25) automatedly is verified when generating a new transaction block (17) and the generation is denied if, when verifying the licensee identification (10), no authorization can be proven.

16. The method according to claim 13, wherein the license identification (7) is a hash value calculated using a hash algorithm, which has been determined on the basis of at least the licensor identification (9), the licensee identification (10) and the file information item (11).

17. A method for use in a data processing device of a utilization device connectable to the network, wherein a release authorization for an authorization request is derived from an electronic documentation of license information items, which is managed using the method described in claim 5, wherein, in an authorization query step, in the transaction database (18) those license information items are determined and read as authorization information items, which are associated with the usage data file (2) to be released via the file information item (11), or which contain a license identification (7) previously stored in the data processing device of the utilization device, and wherein, in a subsequent authorization verification step, an authorization release is determined by verifying whether the authorization request relates to a use of the usage data file that is not excluded by the usage restriction information item or has already been performed and exhausted on the basis of the license usage information items, and the usage data file is released for use with the utilization device, if the authorization release is determined.

18. The method according to claim 17, wherein a new license information item is generated with a license usage entry (25) using the utilization device before, during or after a use of the license of the licensor (1), which license usage entry is added into a new transaction block (17) using the block generation method of the transaction database (18), wherein the license usage entry (25) contains at least the license identification (7) of the licensing entry (6) and a usage identification.

19. The method according to claim 17, wherein a product is manufactured using the utilization device, wherein a unique usage serial number (23) is generated before or during the manufacture of the product, wherein the product is marked with the usage serial number (23) and wherein the licensee (5) adds a license usage entry (25) and additionally a further license information item (26) to the transaction database (18), wherein the further license information item (26) includes a license serial number entry containing at least the licensee identification (10) and the unique usage serial number (23).

* * * * *